(12) United States Patent
Hewitson et al.

(10) Patent No.: US 7,561,730 B2
(45) Date of Patent: Jul. 14, 2009

(54) THREE DIMENSIONAL IMAGES

(75) Inventors: Peter Hewitson, Uxbridge (GB); Gareth B. Evans, Potten End (GB); Christopher J. Winscom, Harrow (GB); Leslie R. Wells, Bounds Green (GB); Jennifer C. Loveridge, Harrow (GB)

(73) Assignee: Eastman Kodak Company, Rochester, NY (US)

( * ) Notice: Subject to any disclaimer, the term of this patent is extended or adjusted under 35 U.S.C. 154(b) by 1297 days.

(21) Appl. No.: 10/732,067

(22) Filed: Dec. 10, 2003

(65) Prior Publication Data

US 2004/0136571 A1 Jul. 15, 2004

(30) Foreign Application Priority Data

Dec. 11, 2002 (GB) ................. 0228875.1

(51) Int. Cl.
*G06K 9/00* (2006.01)
(52) U.S. Cl. .................................. 382/154
(58) Field of Classification Search ................. 382/154
See application file for complete search history.

(56) References Cited

U.S. PATENT DOCUMENTS

| 4,871,992 | A |   | 10/1989 | Peterson |
| 5,636,038 | A |   | 6/1997  | Lynt et al. |
| 5,842,867 | A | * | 12/1998 | Hong et al. ................. 434/114 |
| 6,109,922 | A |   | 8/2000  | Litschel et al. |
| 6,298,010 | B1 |  | 10/2001 | Ritz et al. |
| 2001/0016818 | A1 | | 8/2001 | Hara et al. |
| 2002/0159629 | A1 | | 10/2002 | Dutta et al. |
| 2003/0026460 | A1 | * | 2/2003 | Conrad et al. ............... 382/114 |

FOREIGN PATENT DOCUMENTS

| DE | 42 18 869 | | 12/1993 |
| DE | 198 53 915 | | 5/2000 |
| DE | 19853915 A1 | * | 5/2000 |
| EP | 0 837 437 | | 4/1998 |
| FR | 2 715 831 | | 8/1995 |

OTHER PUBLICATIONS

"Automatic Visual to Tactile Translation—Part I: Human Factors, Access Methods, and Image Manipulation" by Thomas P. Way et al., IEEE Transactions on Rehabilitation Engineering, IEEE, New York, vol. 5, No. 1, Mar. 1, 1997, pp. 81-94.

* cited by examiner

*Primary Examiner*—Wesley Tucker
(74) *Attorney, Agent, or Firm*—Frank Pincelli (57) ABSTRACT

A method and system of capturing a three dimensional image of an object or scene and using the information obtained to produce a physical representation of the object or scene. The physical representation may be dynamic, for moving objects, or permanent.

9 Claims, 4 Drawing Sheets

THREE DIMENSIONAL IMAGES

CROSS REFERENCE TO RELATED APPLICATIONS

This is a U.S. original patent application which claims priority of Great Britain patent application No. 0228875.1 filed on Dec. 11, 2002.

FIELD OF THE INVENTION

This invention relates to the field of devices to improve communication of their surroundings to visually impaired people.

BACKGROUND OF THE INVENTION

Electronic cameras are commonly used to capture both still and moving images. The images can be viewed immediately or stored for later viewing and printing. Systems using real-time display of moving images are useful for applications in surveillance and when the viewer is remote from the scene to be imaged, for example surveying drains or in endoscopic medical investigations. All these cases involve the display of the image information in a visible form.

Commercially available electronically addressed tactile panels such as the Papenmeier Braillex, manufactured by F.H. Papenmeier GmbH & Co. KG of Germany, exist to allow visually impaired people to read Braille-encoded text. They usually provide just 40 (or sometimes 80) 6- or 8-dot cells, each cell depicting a text character. See http://snow.utoronto.ca/technology/products/refreshable-braille.html The need for a tactile computer screen has been recognized. For example, the concept of a system capable of a full screen of text is described in U.S. Pat. No. 4,871,992.

U.S. Pat. No. 5,842,867 describes a graphic tactile cell for indicating a graphic pattern, in which the arrangement of the tactile surface can be enlarged easily. This graphic tactile cell includes tactile pins for indicating a graphic pattern by vertical movement, piezoelectric element segments which are bent upon application of a voltage to vertically drive the tactile pins, and a unit base for holding the tactile pins and the piezoelectric element segments. A plurality of cell units each including a unit number of tactile pins, corresponding piezoelectric element segments, and a unit base for holding the tactile pins and the piezoelectric element segments are coupled vertically and horizontally such that the tactile pins are arranged at an equal interval in vertical and horizontal directions. Proximal ends of the piezoelectric element segments are held by the unit base through plastically deformable adjusting members.

U.S. Pat. No. 6,109,922 describes a perforated plate with axial pins positioned in at least two stable positions with electromechanical actuators for this purpose.

Such devices have been demonstrated for use with line images derived from two dimensional digital images by the National Institute for Standards and Technology, Gaithersburg. In this device lines are produced by using pins raised to a single position above the plane of the display tablet.

U.S. Pat. No. 6,298,010 discloses an "orientation aid for the blind and visually disabled". This consists of a distance measuring system consisting of a projected single beam and reflected beam detector whose signal can be interpreted as the distance of the device from the reflecting object. This distance is indicated by a tactile indicator.

Another device to aid the blind appreciate the surrounding area is one which emulates the process of the blind person who uses reflected sound from the tapping of a stick to provide some awareness of obstacles such as walls. U.S. application No. 2001/0016818 A1 describes a device for analyzing sound in terms of an amplitude versus frequency relationship and converting amplitude signals in several discrete frequency regions into control signals. The control signals are used to control a linear array of tactile transducers which are sensed by the user.

Systems for producing three dimensional objects from three dimensional image information exist. For example, 3-D Systems Inc. produce a number of products enabling the production of three dimensional objects from Computer-Aided Design systems. One such "Solid Object Printer" is the "ThermoJet" printer. This is a type of inkjet printer using a melted wax ink which, after deposition, dries to form a layer of wax. The object is built up from several layers of wax.

Three dimensional relief objects can be produced by vacuum forming techniques. In such techniques, a first surface is produced for the purpose of forming a further surface conforming to the shape of the first surface, the further surface being formed by a material which can be deformed to the required shape and then becomes rigid to hold the deformed shape. The lack of re-entrant angles allows the easy removal of the rigid further surface. Typically, a sheet of thermoplastics material is heated so that it softens and is then laid over the first forming surface. Using suitable techniques, air can be extracted from between the forming surface and the thermoplastics sheet. Atmospheric pressure then forces the sheet to conform with the forming surface. The sheet becomes rigid on cooling.

Problem to be solved by the Invention

The information in a visible image, i.e., the spatial distribution of light intensity or brightness, which could be displayed to a blind person using a tactile panel is not particularly useful. The shape of an object is much more useful information in this case. The blind person also needs an appreciation of the nearness of objects, particularly dangerous objects such as moving vehicles. It is far more useful to have a two-dimensional array of distance indicators which can be scanned by touch than a device for sampling only one element of such an array at any one time.

A problem to be solved is that of providing an aid to the orientation of a blind person who has little or no ability to detect features of the surroundings which may put him or her at risk. The problem is, therefore, to provide images of the scene in a way which conveys three-dimensional information in real time. This would allow the person to be aware of features of the floor or ground such as steps or curbs, obstructions such as furniture or lamp-posts, nearby people or animals or potentially dangerous traffic. Preferably, the form of the image produced is a dynamic three dimensional form.

Another problem to be solved is the provision of permanent or quasi permanent three dimensional relief images in a convenient and inexpensive way. Such relief images would be useful as records of original objects or scenes, such as faces or buildings, which can then be appreciated by blind people by touch. It would be useful for blind and visually impaired people to have access to such relief images or alternatively to have access to the information in digital form and use a suitable device to produce the relief image. This relief image may be a permanent image or a temporary image in a device capable of generating three dimensional surfaces. This device could be the same as the device suitable for providing real time dynamic three dimensional surfaces.

It will be appreciated that any apparatus capable of providing such three dimensional surfaces can also be used by sighted people who can appreciate the three dimensional surface by sight as well as by touch.

SUMMARY OF THE INVENTION

It is an aim of the invention to capture a three dimensional image of an original object or scene and to display it in a manner suitable for a visually impaired person.

According to the present invention, there is provided a method for capturing a three dimensional image of an object or scene and using information obtained therefrom to produce a physical representation of the scene, the physical representation having a surface in which one characteristic of the surface represents the distance from the point of image capture of that point of the scene corresponding to the position on the surface in two dimensions.

The characteristic of the surface representing the distance from the point of image capture of that point of the scene corresponding to the position on the surface in two dimensions may be the height of the surface above a reference plane. The characteristic may alternatively be a physical stimulus such as temperature, the difference in temperature at differing positions on the surface representing difference in distance. Differences in vibration amplitude, or frequency could also be used.

The invention further provides a system comprising means for capturing a three dimensional image of an object or scene, means for obtaining information therefrom, and means for producing a physical representation of the scene using the obtained information, the physical representation having a surface in which one characteristic of the surface represents the distance from the point of image capture of that point of the scene corresponding to the position on the surface in two dimensions.

A stereoscopic camera arrangement could be used to capture the three dimensional image. In the case of stereo images, the camera or arrangement of cameras captures images from at least two positions and the image information obtained used to produce a three dimensional image. Alternative methods could also be used, such as, for example, those based on sonar technology. Infra red light may also be used.

The depth information obtained is converted into an electronic signal which is used to produce a display of the image which can be sensed in a way which is interpretable as a three dimensional object representing the original object or scene. Other information which may have been used to determine the distance but cannot be displayed can be discarded. Alternatively, it can be retained in order to provide additional information.

A dynamic display can be produced in which the image information is repeatedly captured, processed, and converted to a three dimensional output image in a form which can be sensed. Provided this is done rapidly enough, a real time dynamic image can be generated.

An output image could be produced using a refreshable tactile display panel similar to those used for Braille character formation and which uses a two-dimensional array of individually addressable pegs or pin members whose height can be adjusted to convey the distance of elements of the original from the camera.

By feeling the three dimensional object or the dynamic pattern of the tactile panel, the blind person can interpret the shape in terms of shape of the original object or the distances of various parts of a scene.

Changes other than spatial dimensional changes to the image surface can be produced to indicate the depth. These would need to be interpreted as image depth.

Advantageous Effect of the Invention

The present invention can provide either a static or a dynamic image. A static object would result in a relief image. This static image could be, for example, an image of a location, building, object or person. This could be given to a visually impaired person thus giving that person an experience equivalent to a conventional visible picture.

In the case of a dynamic image, the invention provides a distinct safety advantage. A real time image of the environment is provided. Thus the presence of hazards such as stairs, lamp posts and other obstructions is indicated.

BRIEF DESCRIPTION OF THE DRAWINGS

The invention will now be described, by way of example, with reference to the accompanying drawings, in which.

DETAILED DESCRIPTION OF THE INVENTION

Figure 1:
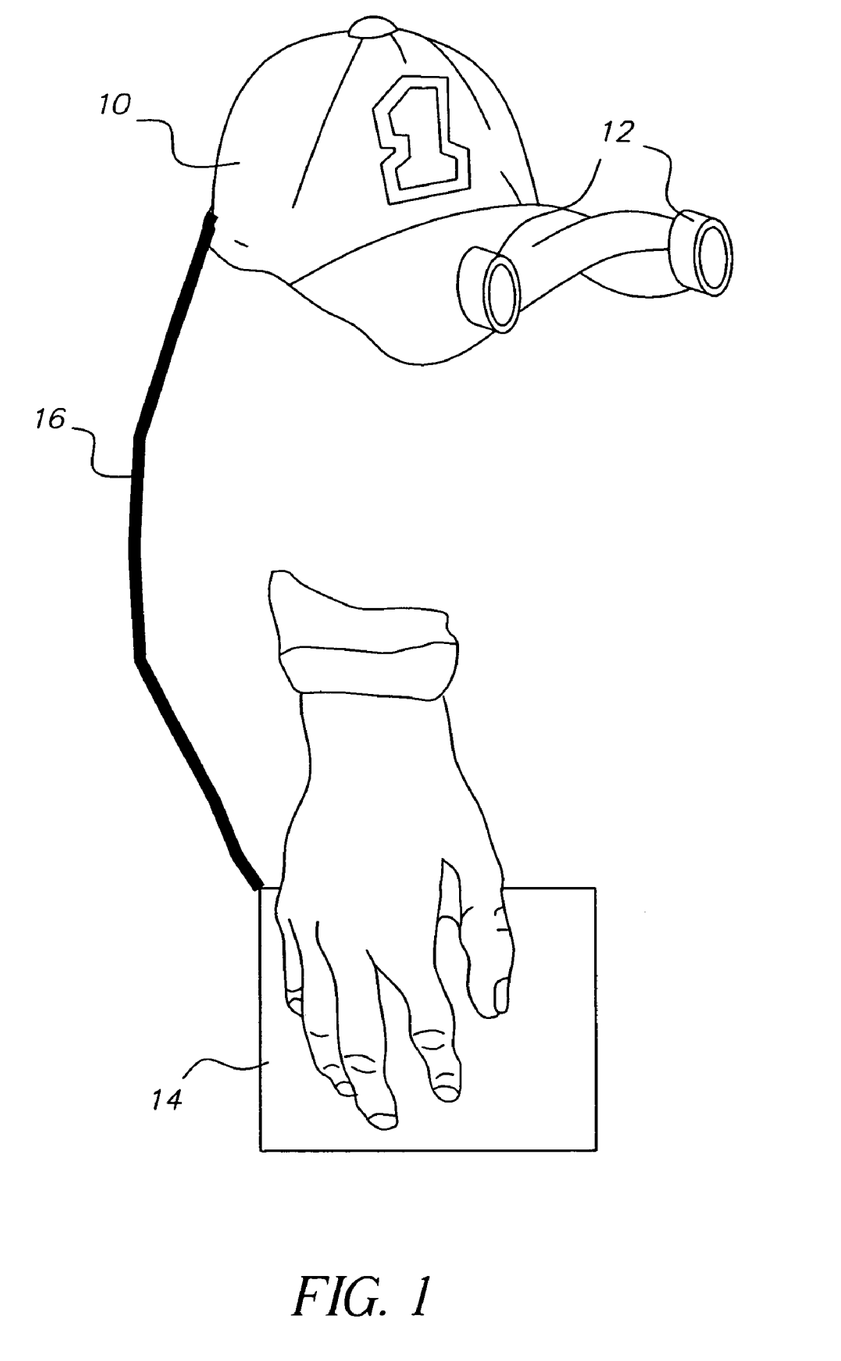
FIG. 1 is a schematic representation of a system according to the invention.

FIG. 1 illustrates a system according to the invention. This system is intended for the provision of a dynamic three dimensional display. For a three dimensional "print", that is a solid object or surface representing a static object or scene, a film-based stereoscopic camera may be used. Such cameras have at least two lenses for exposing at least to areas of film simultaneously. If an object is sufficiently stable, a single camera can be used to capture images from more than one position. In either case, the captured images can be scanned and converted to digital image files for the purpose of deriving from them the required depth information.

For the purpose of stereo imaging for human viewing, it is necessary for the lenses to be positioned on a horizontal line at approximately the human inter-ocular distance. This enables the images to be appreciated by the viewer as a single three dimensional image when one image of the stereo pair is seen by one eye and the other by the other eye. The distance apart of the capture positions dictated the degree of the perception of depth by the viewer. For the purpose of capturing images for deriving depth information, neither the requirement of the inter-ocular distance, nor the horizontal disposition of the capture points apply. Indeed it may be desirable to employ quite different distances between capture positions. Since, for example, the depth information in the case of an orientation aid using a dynamic three dimensional tactile display surface, the distance scale is severely compressed, it may not be necessary for the capture positions to be more than, for example only, 10% of the inter-ocular distance.

Such distances allow more compact capture devices. Also, it becomes easier to use a single device and move it from one position to the other. In an extreme case it may be possible to vibrate the single device and relate the lateral translation of elements of the scene to their distance. The rapid positioning of a single capture device could allow sufficiently high rates of image capture to be useful in a dynamic display.

In the embodiment illustrated in FIG. 1 a pair of digital video cameras 12 are provided to capture a three dimensional image of an object or scene. In this instance, the cameras are located on either side of a peak of a cap 10. It will be understood that it is not essential that the cameras 12 are located on a cap. Any place where the cameras are at a suitable distance apart could be used. The cameras 12 are in connection with a tactile output panel 14 via a wire 16. A processor is located wherever convenient within the system to process the signals from the camera into information suitable for the tactile panel 14. This will be described in more detail later. It will be understood by those skilled in the art that it is not essential for the cameras and panel to be physically attached. The method of the invention may also be accomplished using radio signals or other wireless means.

It is, of course, possible to use a stereoscopic camera instead of two physically separate cameras. The only distinction is that the two or more lenses are physically linked at a known distance in the stereoscopic camera.

It can be appreciated that a three dimensional surface which represents a scene and which is in the form of a relief surface to be sensed by touch, must have a maximum range of depths, representing a range of distances from the capture point of various parts of the scene. This maximum difference in height, for example the maximum travel of an actuated pin in an array of pins, is subject to design compromises as well as factors which maximize the effectiveness of the display. Typically, the display height range would be a few millimeters, for example 5 mm. In this case, the most distant objects would be indicated by zero travel of the pin, that is the base height of the display. The nearest objects would be represented by a pin standing 5 mm proud of the base position.

The actual distance of the various parts of the scene are, therefore, considerably compressed. For greatest effectiveness as an orientation aid, that is an aid to a visually impaired person to gain an awareness of nearby objects or structures, the preferred relationship between distance and display height is not linear. For example, it may not be important to distinguish between distances over a certain maximum, for example, 10 m, whereas it is important to appreciate when a collision with an object is probable or an object such as a seat or door is being sought. If x is the degree of compression, that is the ratio of the difference in distance between two parts of a scene from the capture point, to the difference in heights of the display surface, then x must vary with distance. The relationship between distance and compression could, for example, be derived from the reciprocal of the distance. This approach is illustrated in the following table.

| Distance from capture Point (meters) | | Difference, d 1/d between | Height difference of display | |
|---|---|---|---|---|
| Pos 1 | Pos 2 | Pos 1 and Pos 2 | $(mm^{-1})$ | (mm) |
| Infinity | 4 | Infinity | 0 | 0 |
| 4 | 2 | 2 | 1/2000 | 0.5 |
| 2 | 1 | 1 | 1/1000 | 1 |
| 1 | 0.5 | 0.5 | 1/500 | 2 |
| 0.5 | 0.25 | 0.25 | 1/250 | 4 |

In this illustration the difference in distance for near objects is translated into much greater relative heights in the display surface. Other, more complex relationships between scene distance and surface height may be derived empirically.

The display surface will probably have a limited number of discrete positions. For example, the range of heights will be divided up into perhaps 8 positions, that is 4 bits of depth information. In this case one increment of height would be 0.5 mm.

When an object in the scene is particularly close, i.e. when the surface height is maximized or nearly maximized, there may be a particular danger of bumping into an object such as a lamp-post. The fact that the surface height of the display surface may be near maximum may not be obvious. In such circumstances it would be useful to provide an additional indication of proximity. This can be achieved by any of the methods indicated later as alternatives to height as a distance indicator, or as means of providing additional information. For example, the surface could be made hotter when near the limits of the height range. Alternatively, a separate method of indicating proximity could be provided which was controlled by the same input information that is used to provide the depth information for the tactile distance indicator. As an example, an audible signal could be provided if the distance of any part of the scene captured was closer than a given distance, say 0.25 m.

In other applications of the invention, examples being mentioned at the end of the specific description, it may be desirable to use very different relationships between scene or object distance and the display height. For example, it may be advantageous to exaggerate differences between distances such as would be the case in reproducing an exaggerated surface characteristic. It may be useful to amplify rather than compress features such as dents or cracks. In three dimensional maps for example, the height dimension is often amplified relative to the plan dimensions. In these cases, it may be preferable to use wider spacing between capture points as well as changing the mathematical relationships used in computation of the surface of the three dimensional image.

It is also possible that the position information from the original scene is conveyed to the user through the position on the surface of a two dimensional display device of a sensed surface characteristic. In this case, the display could represent a plan view of the scene with the user positioned at a particular point in the plan view, for example, in the middle of one edge of a rectangular display device. The surface characteristic could be the position on the surface in the dimension orthogonal to the plane of the other two dimensions. Alternatively, it could be any of the surface characteristics described elsewhere in this application, such as temperature or vibration.

It will be understood that the display in this case would convey somewhat different dimensional information from the case of a perspective view. For example, a lamp post could be represented by a small region of the surface, possibly circular in form, and perhaps raised above a base plane. The height of the raised surface could represent the height of the object. This would not give a particularly accurate representation of the height of the scene feature but its position relative to the user would be better assessed. This may be particularly important in the case of an orientation aid for a visually impaired person.

It will be appreciated that for visual sensing of the output image, it is not necessary to produce a physical image. The three dimensional image can be in the form of digital image files which can be displayed in a way which allows the visual appreciation of the depth information.

Figures 2, 3:
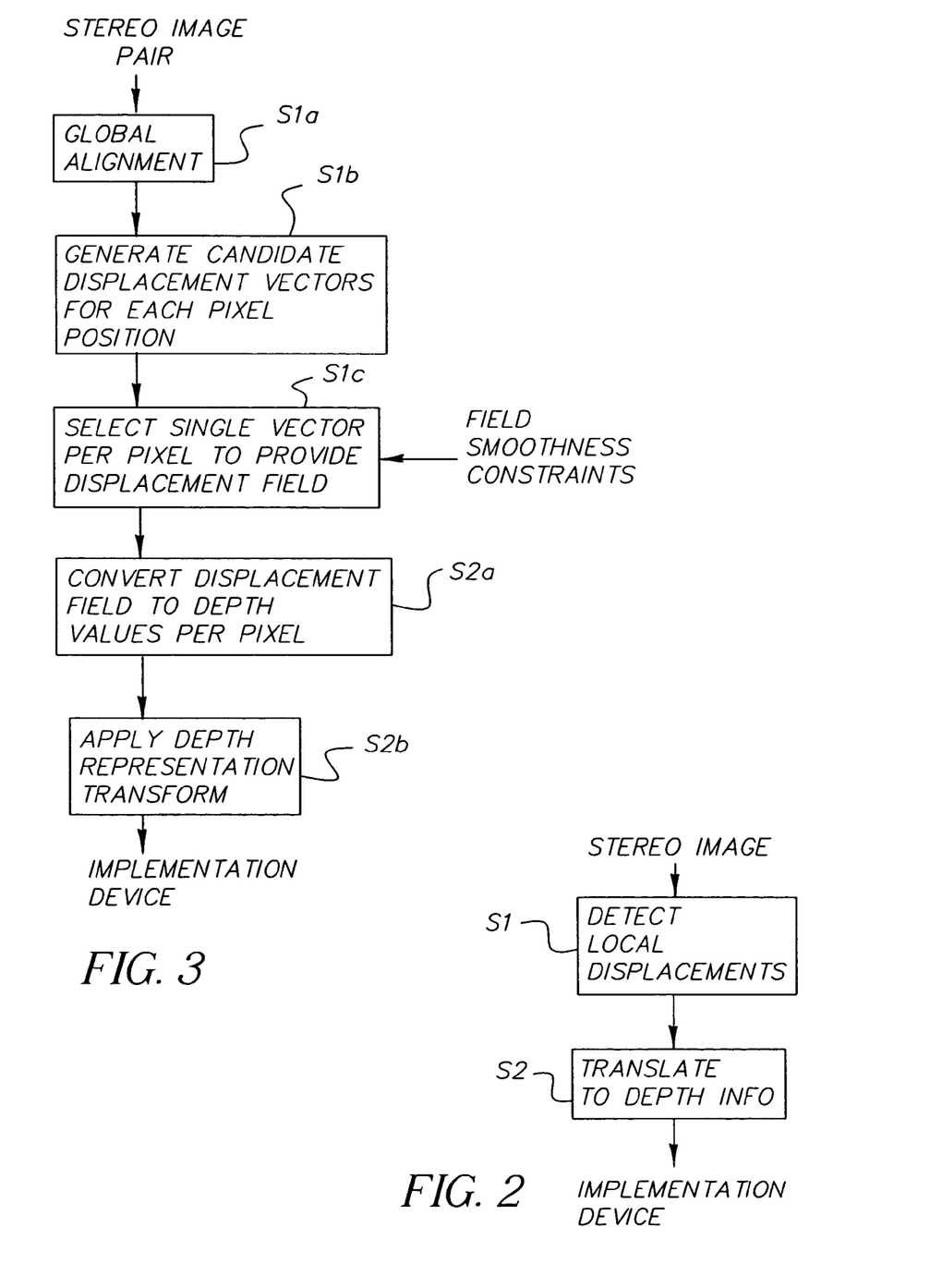
FIG. 2 is a flow chart setting out the main steps of performing a method of the invention.
FIG. 3 is a flow chart setting out the steps of the invention in more detail.

FIG. 2 sets out the two main steps of performing a method of the invention.

The pair of cameras 2 capture a stereo image pair. Step S1 detects the local displacements within this image pair. Step S2 translates the local displacements between corresponding features in the image pair to an estimate of depth, that is, the distance between the objects in the scene that correspond to those features, and the plane of image capture. The depth information is then sent to an implementation device, such as a tactile panel. FIG. 3 describes Steps S1 and S2 in greater detail.

With reference to FIG. 3, in step S1a the stereo image pair captured by the cameras 2 is subject to global alignment. If the optics of the device or devices used to capture the image pair is aligned, such that the stereo pair is properly registered, then this step is not required. Otherwise, global alignment is advantageous because it minimizes the search area for corresponding features in the stereo pair. This improves the accuracy of the estimates of local displacements and minimizes the computational load.

A variety of techniques may be suitable to generate a global displacement vector for the purpose of global alignment but the preferred technique for this application is partially normalized phase correlation. The details of a method to generate a global displacement vector to sub-pixel accuracy using partially normalized phase correlation is disclosed in EP 0659021. One of the pair of stereo images may then be globally aligned with the second of the pair of stereo images by interpolation methods well known in the art, for example bicubic interpolation, according to the global displacement vector. The displacement vector field, described below, is then generated for the globally aligned stereo pair, in step S1b.

In step S1b a displacement vector is then generated for each pixel position.

A set of displacement vectors, typically with sub-pixel accuracy, is generated which characterizes the local x,y displacement between the pair of digitized stereo images. A variety of techniques may be suitable, including block matching, and the method of differentials, both well known in the art (Image Processing, edited by D Pearson, Chapter 3, "Motion and Motion Estimation", G. Thomas, PP40-57, McGraw-Hill, 1991), but the preferred technique for this application is phase correlation. For a more complete disclosure of phase correlation techniques see Pearson (reference above) and also EP 0659021, for a method to generate displacement vectors to sub-pixel accuracy using partially normalized phase-correlation techniques.

A set of corresponding sub-blocks of appropriate size is defined in each of the pair of digital images. Although it is possible for the sub-blocks to be overlapping in this application, it is appropriate to use non-overlapping, abutting blocks. An appropriate block size provides a compromise between being sufficiently large to encompass the largest displacement between the images, and sufficiently small to provide the required accuracy.

At least one displacement vector is generated for each of the sub-blocks in the set. In this example, partially normalized phase correlation is used to indicate possible displacements between the pair of stereo images for each sub-block in turn, using the equation:

$$C_{p,q}(x, y) = F^{-1}\left\{\frac{P(u, v) \cdot Q(u, v)^*}{|P(u, v) \cdot Q(u, v)^*|^n}\right\}$$

where $P(u,v)$ and $Q(u,v)$ are the two dimensional Fourier transforms at spatial frequencies $(u,v)$, of sub-blocks p,q at corresponding positions in the two images; n is a normalization factor typically $0.5<n<0.9$; $F^{-1}$ is the inverse Fourier transform; $C_{p,q}(x,y)$ is the correlation surface as a function of displacements (x,y) for the input blocks p,q.

For each sub-block, the set of displacement vectors (x,y) are stored that yield the highest peaks in the corresponding correlation surface, $C_{p,q}(x,y)$. It is possible to choose a fixed number of displacement vectors per sub-block, but in this application it is preferred to select all those displacement vectors for each sub-block that yield a peak value higher than a selected threshold value t, where typically $0.05<t<0.2$ It will be noted that the correlation surface for each sub-block, centered at a (0,0) displacement, is the same size as the input sub-blocks and sampled at the same sampling rate as the input data. Hence, the displacement vectors are generated to pixel accuracy. For this particular application it may be required to generate depth information to greater accuracy than can be obtained if the displacement vectors are measured to pixel accuracy. In these cases, the correlation surfaces may be interpolated to estimate the position of the peaks, and hence the displacement vectors, to sub-pixel accuracy, according to the method disclosed in EP 0659021.

The final step in generating a displacement vector field is to generate a set of candidate vectors for each pixel position in one of the pair of stereo images. In the preferred method, the candidate vectors include the set of vectors for the sub-block in which the pixel in question lies, and possibly one or more of the vectors from one or more of the neighboring sub-blocks. For each pixel in one of the pair of images, each of the candidate vectors is checked in turn to determine a single vector per pixel that produces the minimum delta error between the pixel value in the first image and the appropriately displaced pixel value in the second image. This takes place in step S1c.

Several strategies may be employed to minimize noise in the resulting displacement vector field. First, the choice of the displacement vector per pixel may be a function of the minimum delta error weighted with a measure of the displacement vector length. Hence the vector selection process is weighted towards shorter vectors, and smaller displacements. Secondly, the choice of the vector for each pixel may be constrained by the selected displacement vectors for neighboring pixels. Alternatively, the vector field itself may be spatially filtered to minimize noise. In this application the third option is preferred, and the chosen filtration method is one that suppresses noise but maintains 'edges'. Here 'edges' are defined as real breaks in the vector field that correspond to non-smooth parallax changes at positions in the stereo pair of images that correspond to non-smooth depth changes in the scene. Several techniques for edge-maintaining noise suppression are well known, and include median or sigma filters.

It is further noted that in the case of a pair of stereo images, parallax between the images will only arise parallel to the axis that joins the image capture devices. Hence, displacement vectors relating to this parallax should lie in a single dimension. It may be possible to take advantage of this constraint by applying the technique to estimate the displacements in this one dimension, that is using one dimensional blocks that lie in the direction of the displacement. However, unless the system is limited by processing speed, the preferred method is to calculate two dimensional correlation surfaces, as described above, but to select only those vectors that lie in an appropriate direction as defined by the parallax.

Once the displacement field has been determined trigonometry can be used to convert the displacement field to depth values per pixel, performed in step S2a, according to the following equation:

Depth=function(1/displacement field value)

where the function is a scalar dependent on the spacing between the lenses and the focal length of the lenses.

The depth values are then transformed by an appropriate function to provide a depth representation value to be sent to the implementation device, performed in step S2b. In the case where the implementation device represents the distance of the object or scene from the point of image capture by means of modifying the height of the device's surface above a reference plane, and that reference plane is defined as corresponding to objects at infinity in the scene, it will be noted that the functional relationship between depth of objects in the scene and depth representation on the device also has an inverse characteristic. Hence, scene objects at or close to infinity will be represented by zero or near zero displacements of the surface, and nearby objects will be represented by relatively large displacements of the surface. Ideally, this function is monotonic but non-linear, with a gradient that decreases to zero with increasing depth, for example 1/depth, or an appropriately offset negative logarithmic function. In this way, the differences in depth of objects further away from the plane of image capture are given less emphasis than differences in depth of close objects. Where the object distance, the resolution of the stereo capture device and the derivation of the correlation surfaces results in a displacement vector having a value zero, then that object depth is defined as infinity. Hence the capture system resolution imposes an upper boundary on the maximum depth the system can handle. There may be a further advantage, to optimize the design specification of the display system and also to aid interpretation of the signal on that display system, in setting, by the form of the non-linear function, a maximum depth beyond which object depths are defined as infinity, which is lower than that imposed by the capture system. It will be noted that although two successive transformations are described above, for local displacement to depth and then to depth representation, these transformations can be combined in a single operation.

For a real time display, the signal from the cameras would have to be constantly updated. For instance, the cameras could take up to ten frames per second. This would give the visually impaired person an optimum amount of information as they moved and aid their orientation.

For real time displays, it is essential that digital cameras are used.

If desired, it would be possible to provide feedback from the cameras to determine whether or not they are fixed in position relative to each other.

The implementation device may take the form of a tactile unit/panel. The tactile panel produces a flattened three dimensional image of the scene in real time.

In the case of a dynamic display in which each pixel is represented by the height of the surface element, the height could be controlled by an actuated peg or pin member. The surface produced by the aggregate of the pin members provides the important spatial depth information. This display would be continuously refreshed and continuously felt to provide a dynamic view of the scene as appreciated through touch.

Figure 4:
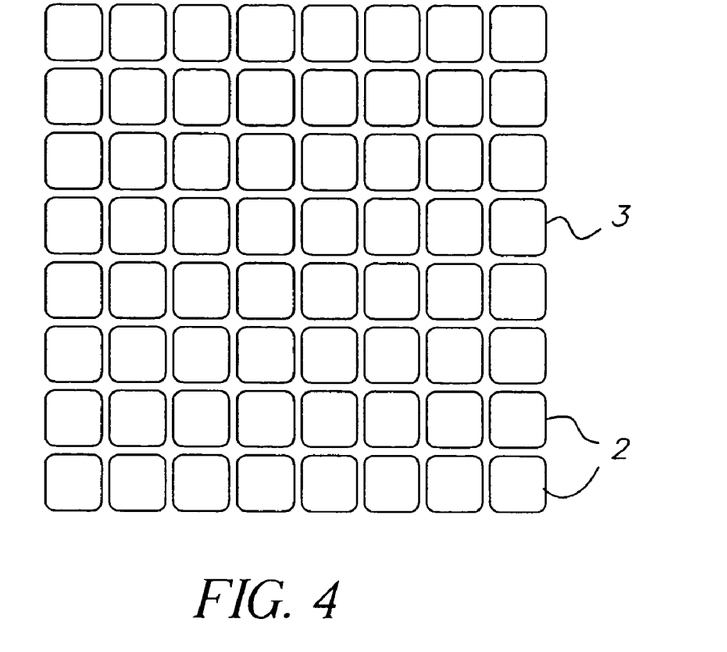
FIG. 4 is a schematic representation of means for producing a three dimensional image.
Figure 5:
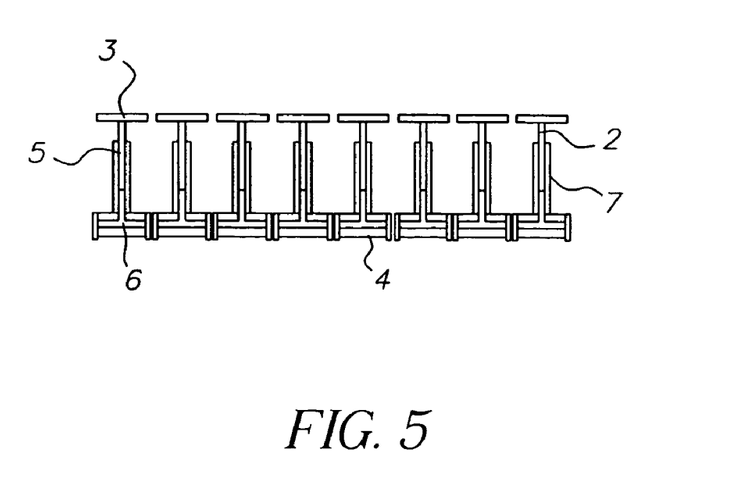
FIG. 5 shows a side view of the schematic representation illustrated in FIG. 4.
Figure 6:
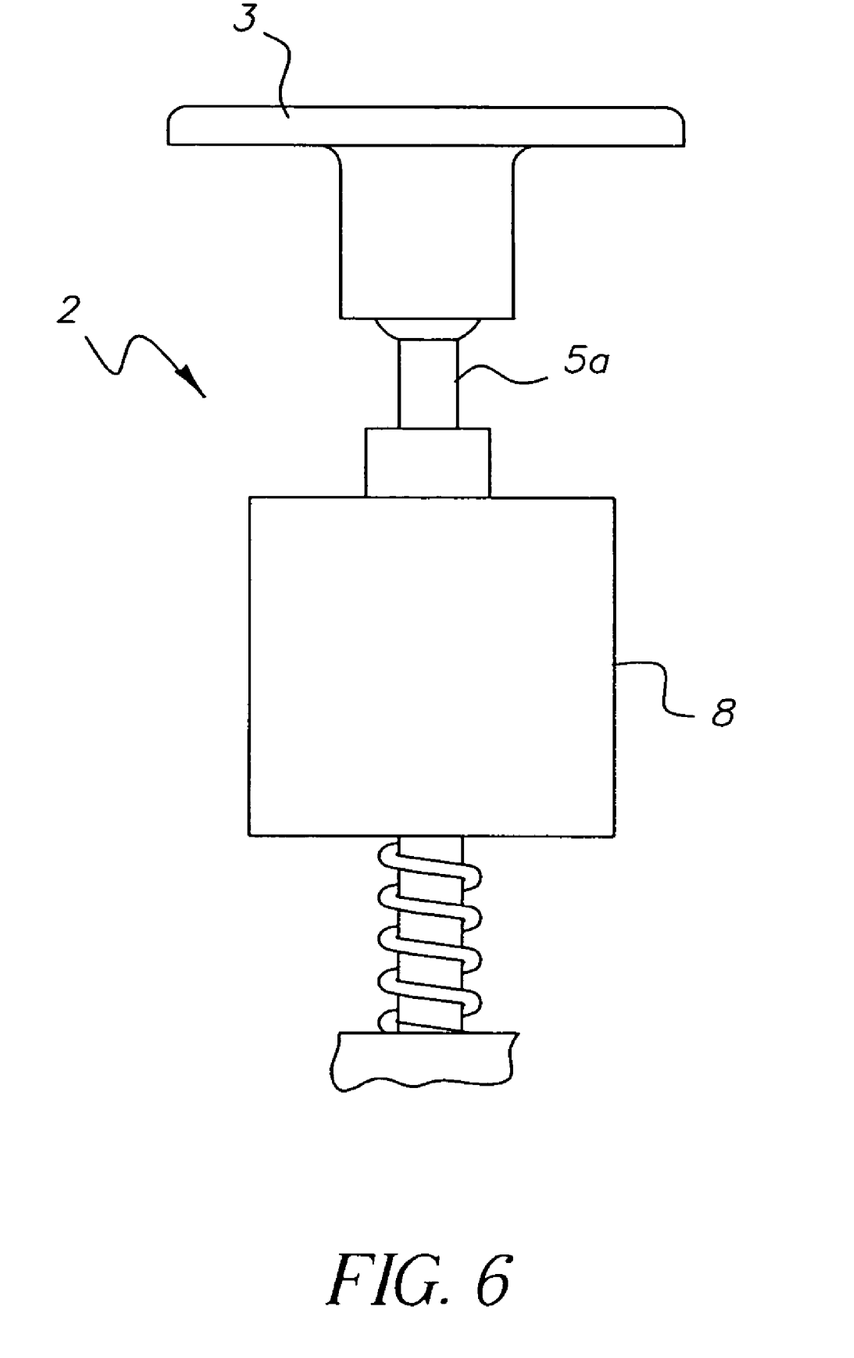
FIG. 6 is a further schematic representation of means for producing a three dimensional image.

FIGS. 4, 5 and 6 show schematic representations of possible tactile units.

FIG. 4 is a schematic plan view of a tactile display unit.

The unit comprises an array of pin members 2. Each pin member can be activated individually.

FIG. 5 is one example of how the pin members may be actuated. In this instance each pin member 2 has an upper surface element 3 and an elongate member 5 depending from the bottom thereof. The surface element 3 may be tiltable with respect to the elongate member 5. Each elongate member is located within a corresponding shaft 7. Each shaft is filled with hydraulic fluid 6. The hydraulic fluid is acted upon by actuator 4. The elongate member 5 thus acts as a piston for moving the surface element 3. The actuator is driven by a piezoelectric element, not shown. The actuator may alternatively be driven by an electro-magnetic element. It will be understood by those skilled in the art that what is important is that the minute movements of each piezoelectric or electro-magnetic element is magnified by the piston assembly such that a person using the display unit can sense the positional difference of the surface elements 3 relative to each other.

FIG. 6 is a schematic representation of a further means for moving the surface elements 3 of the tactile array. In this case, each surface element 3 is moved by actuation of a solenoid 8. The elongate member 5a is in this embodiment a magnetic element. Activation of the solenoid 8 controls movement of the elongate member and, thus the vertical position of the surface elements of the pin members.

Other means of activation could include mini rotary motors which drive a screwthread for translation into vertical movement. This has the advantage of preventing downward movement of the surface element when a person presses down on the tactile unit. The rotary motor could, for example, be a stepper motor.

All the members and elements described will of course be miniature to allow the tactile unit to be approximately hand sized.

It will be understood by those skilled in the art that the above two embodiments are examples only and the invention is not limited to these examples. The movement of the pin members may be controlled in any convenient manner.

The pin members may support a membrane allowing a continuous surface in which the membrane provides a mechanical interpolation between the discrete positions of the surface elements of the pin members. It will be appreciated that a greater density of pin members gives a more detailed image. The number of vertical positions of the pin members would preferably be greater than two. The optimum would be the number which gave a difference between two pin member heights that could just be discerned by a person using the display. This may, for example, be thirty two different levels. The actuating device needed to provide movement of the pin members should also prevent movement downwards due to pressure from the user's fingers.

Although the depth information may be greatly compressed, the sensitivity of the finger to small positional differences, particularly in adjacent surfaces or points, allows an effective amplification of the compressed depth information in the display device.

By "scanning" the device with rapid sweeping finger movements, the surface can be appreciated quickly. Changes in the surface shape can be detected. If the information is updated frequently, the device would allow the movement of an object to be detected. It will be appreciated that the skills similar to those developed which enable the rapid reading of Braille characters will be developed to enable detailed interpretation of the three dimensional image and its movements. It is anticipated that visually impaired people would quickly be able to recognize lamp posts, doors and walls for example and moving objects such as people, animals and motor vehicles. In combination with information from other senses, particularly hearing, a much enhanced understanding of the person's environment would be expected.

The pin member could also provide further additional information. Any method which allows each pin member to be distinguished in a non visible manner could be used. For example, each pin member could be made to vibrate, the amplitude and/or frequency conveying an image characteristic. A further example could be using temperature as a method of differentiating between pin members. Another example could be to use a voltage, providing a current to be discharged through the skin. It is, of course, possible for any of these techniques to be used on a flat surface to indicate depth as an alternative to using the relative height of the pin members.

It is not essential that pin members are used to provide the change in feel of the surface. It is possible to produce cavities using an electrical signal.

Such a use is described in U.S. Pat. No. 5,580,251. The cavities can also be vibrated.

It will be obvious to the person skilled in the art that any combination of properties can be used to provide additional information.

As an alternative to an array of sensed pixels, such as pin members, each of which is independently addressed and controlled, one pin member representing each pixel, a display could be provided in which the position of a finger in a two dimensional image is sensed and signal passed to the end of that finger. This signal could be in the form of a positional change in the array or any of the alternatives indicated above as alternatives to the height of the pin members. One example is a glove worn by the user in which each of the wearer's finger ends is in contact with a small pad within the fingers of the glove. The pad would then provide a signal to the finger end according to the position of the finger in the two dimensional image. In this way, the number of devices needed to provide a signal could be reduced. In an extreme case, a single finger could be in contact with a single actuated pin member. When the finger moved the position of the pin and therefore the pressure on the finger end could vary according to the image information. Intermediate examples could involve an array of pins, such as an array of three by three pins. The performance of such an example would not necessarily be superior to a full image array of pin members but could make the device less expensive to manufacture.

The above description relates to dynamic images for use when a visually impaired person wishes to orientate themselves and to determine what obstacles lie ahead.

The following description is of a static display such as may be used for a permanent or semi-permanent image.

For a permanent three dimensional image, the scene can be captured by digital or conventional cameras. It is envisaged that a stereoscopic camera would be used. The stereo pair of images can then be scanned to obtain two digital image files. If digital cameras are used, the files are obtained directly from a pair of digital cameras.

The files are processed to provide depth information using image processing algorithms as described earlier. The depth information is then sent to an implementation device as in the formation of the dynamic display. However, in the case of a permanent image, the implementation device acts as a former for deriving a permanent three dimensional image rather than as the display device itself. For example, the pin array as described above can be used as the former, the former providing a three dimensional surface. The array of pin members may be covered by a flexible membrane. A thermoplastics sheet material can then be deformed to conform to this surface resulting in a three dimensional relief image. Any suitable means could be used to deform the plastics material to the shape of the former. For example, the material can be deformed by vacuum forming techniques. An alternative would be to use some sort of pressing technique. It will be understood by those skilled in the art that any suitable means may be used to deform the plastics material. It will be understood that the plastics material will have the property of retaining this shape after it has been deformed to provide the permanent three dimensional image.

The permanent image surface may alternatively be generated by a type of inkjet printer which deposits a series of layers, the number of layers representing the depth of the image. The "printer" may use a wax material or a polymer material.

It can be appreciated that the three dimensional relief image produced by the processes described can also be useful to sighted people. For example, three dimensional relief portraits similar to sculptured portraits could be produced. The invention could also be used to produce three dimensional objects as an aid to explaining concepts or describing prototype equipment.

It should be appreciated that the surface of the three dimensional relief objects can be decorated. For example, photographic images could be projected onto the surface or permanently written onto the surface. The writing process can take place after the three dimensional surface is formed. Alternatively, in the case of surfaces formed by deforming a flat surface, as, for example, described earlier using vacuum forming techniques, the surface may be decorated with a pattern or image prior to deformation. For example, the flat surface can be used as the recording medium in an inkjet printer. The invention could therefore be particularly useful in producing relief maps or landscapes using cartographical data or aerial images.

It will be appreciated from the above that the invention is not limited to the field of orientation aids for the visually impaired. The invention is equally applicable to the engineering field where it is wished to "feel" an object remotely. This may, for example, be useful in maintenance work. This was described earlier in the specification with respect to detection of surface features such as cracks and dents. Furthermore, the invention is not limited to use with light in the visible range. It is envisaged that infra red light may be used for capture of the images.

The invention has been described in detail with reference to preferred embodiments thereof. It will be understood by those skilled in the art that variations and modifications can be effected within the scope of the invention.

| Parts List |
| --- |
| 2. pin member |
| 3. upper surface element |
| 4. actuator |
| 5. elongate member |
| 6. fluid |
| 7. shaft |
| 8. solenoid |
| 10. cap |
| 12. video camera |
| 14. panel |
| 16. wire |

What is claimed is:

1. A three dimensional imaging method comprising the following steps performed by a processor:
   Capturing a three dimensional image of an object or scene;
   Obtaining information from the three dimensional image;
   Producing a physical representation of the scene using the obtained information, the physical representation having a surface in which one characteristic of the surface represents the distance from the point of image capture of that point of the scene corresponding to the position on the surface in two dimensions, wherein the characteristic of the surface representing the distance of the object or scene from the point of image capture is a physical stimulus at each point of the surface, and wherein the physical stimulus is temperature, the difference in temperature representing difference in the distance.

2. A three dimensional imaging method comprising the following steps performed by a processor:
Capturing a three dimensional image of an object or scene;
Obtaining information from the three dimensional image;
Producing a physical representation of the scene using the obtained information, the physical representation having a surface in which one characteristic of the surface represents the distance from the point of image capture of that point of the scene corresponding to the position on the surface in two dimensions, wherein the surface is formed of an array of pin members, and wherein the displacement of the pin members is controlled by an electro magnetic actuator.

3. A system comprising means for capturing a three dimensional image of an object or scene, means for obtaining information therefrom and means for producing a physical representation of the scene using the obtained information, the physical representation having a surface in which one characteristic of the surface represents the distance from the point of image capture of that point of the scene corresponding to the position on the surface in two dimensions wherein the characteristic of the surface representing the distance of the object or scene from the point of image capture is a physical stimulus at each point of the surface, and wherein the physical stimulus is temperature, the difference in temperature representing difference in distance.

4. A three dimensional imaging method comprising the following steps performed by a processor:
Capturing a three dimensional image of an object or scene;
Obtaining information from the three dimensional image;
Producing a physical representation of the scene using the obtained information, the physical representation having a surface in which one characteristic of the surface represents the distance from the point of image capture of that point of the scene corresponding to the position on the surface in two dimensions, wherein the characteristic of the surface representing the depth information is a non linear function of the distance of the object or scene from the point of image capture, and wherein the gradient of the non linear function decreases to zero with increasing distance of the object or scene from the point of image capture.

5. A three dimensional imaging method comprising the following steps performed by a processor:
Capturing a three dimensional image of an object or scene;
Obtaining information from the three dimensional image;
Producing a physical representation of the scene using the obtained information, the physical representation having a surface in which one characteristic of the surface represents the distance from the point of image capture of that point of the scene corresponding to the position on the surface in two dimensions, wherein the surface is formed of an array of pin members, and wherein the temperature of each pin member represents the distance from the point of image capture of that point of the scene corresponding to the position on the surface, or additional information regarding the image, the temperature changing according to that point of the scene corresponding to the position on the surface.

6. A three dimensional imaging method comprising the following steps performed by a processor:
Capturing a three dimensional image of an object or scene;
Obtaining information from the three dimensional image;
Producing a physical representation of the scene using the obtained information, the physical representation having a surface in which one characteristic of the surface represents the distance from the point of image capture of that point of the scene corresponding to the position on the surface in two dimensions, wherein the surface is formed of an array of pin members, and wherein the top of the pin members support a surface element, the surface element being able to tilt with respect to the pin member to conform to an average direction of the surface adjacent the surface element.

7. A method as claimed in claim 2 wherein the movement of the controlling means is amplified to produce a larger movement of the pin members.

8. A system comprising means for capturing a three dimensional image of an object or scene, means for obtaining information therefrom and means for producing a physical representation of the scene using the obtained information, the physical representation having a surface in which one characteristic of the surface represents the distance from the point of image capture of that point of the scene corresponding to the position on the surface in two dimensions, wherein the surface comprises an array of pin members, and wherein the temperature of each pin member represents the distance from the point of image capture of that point of the scene corresponding to the position on the surface, or additional information regarding the image, the temperature changing according to that point of the scene corresponding to the position on the surface.

9. A system comprising means for capturing a three dimensional image of an object or scene, means for obtaining information therefrom and means for producing a physical representation of the scene using the obtained information, the physical representation having a surface in which one characteristic of the surface represents the distance from the point of image capture of that point of the scene corresponding to the position on the surface in two dimensions, wherein the surface comprises an array of pin members, and wherein a surface element is located at the top of and supported by each pin member, the surface element being tiltable to conform to an average direction of the surface adjacent the surface element.

* * * * *